United States Patent
Stapleton et al.

(10) Patent No.: US 10,637,537 B2
(45) Date of Patent: Apr. 28, 2020

(54) DIGITAL MULTIPLEXER IN A DISTRIBUTED ANTENNA SYSTEM

(71) Applicant: Dali Systems Co. Ltd., George Town Grand Cayman (KY)

(72) Inventors: Shawn Patrick Stapleton, Burnaby (CA); Sasa Trajkovic, Burnaby (CA)

(73) Assignee: DALI SYSTEMS CO. LTD., Grand Cayman (KY)

( * ) Notice: Subject to any disclaimer, the term of this patent is extended or adjusted under 35 U.S.C. 154(b) by 0 days.

(21) Appl. No.: 14/580,585

(22) Filed: Dec. 23, 2014

(65) Prior Publication Data

US 2015/0303998 A1 Oct. 22, 2015

Related U.S. Application Data

(60) Provisional application No. 61/920,397, filed on Dec. 23, 2013.

(51) Int. Cl.
*H04B 7/022* (2017.01)
*H04L 12/701* (2013.01)

(52) U.S. Cl.
CPC ............. *H04B 7/022* (2013.01); *H04L 45/00* (2013.01)

(58) Field of Classification Search
CPC ...... H04B 7/022; H04W 24/02; H04W 40/00; H04W 16/10; H04W 52/0206; H04W 88/085; H04L 41/5074; H04L 41/22; G06Q 10/101; G06Q 10/103; G06Q 10/20
See application file for complete search history.

(56) References Cited

U.S. PATENT DOCUMENTS 3,854,122 A * 12/1974 Cross .................... G08C 25/00
340/870.07
6,308,085 B1 * 10/2001 Shoki .................... H04B 7/024
455/273
(Continued)

FOREIGN PATENT DOCUMENTS

CA 2306064 A1 * 10/2000 .......... H04W 88/085
CA 2306064 A1 * 10/2000 .......... H04W 88/085
(Continued)

OTHER PUBLICATIONS

International Search Report, dated Apr. 1, 2015, for International Patent Application No. PCT/US2014/072132, filed Dec. 23, 2014, 4 pages.
(Continued)

*Primary Examiner* — Berhanu Tadese
(74) *Attorney, Agent, or Firm* — Jason H. Vick; Sheridan Ross, PC

(57) ABSTRACT

A system for routing signals in a Distributed Antenna System (DAS) includes one or more Base Band Units (BBUs). Each of the one or more BBUs has one or more digital outputs. The system also includes a plurality of Digital Multiplexer Units (DMUs) coupled to each other and operable to route signals between the plurality of DMUs. Each of the plurality of DMUs is operable to receive one or more digital inputs from the one or more BBUs. The system further includes a plurality of Digital Remote Units (DRUs) coupled to the plurality of DMUs and operable to transport signals between the plurality of DRUs and one or more of the plurality of DMUs.

27 Claims, 10 Drawing Sheets

(56) References Cited

U.S. PATENT DOCUMENTS

| | | | | |
|---|---|---|---|---|
| 6,704,545 | B1* | 3/2004 | Wala | H04L 51/38 455/16 |
| 7,738,381 | B2* | 6/2010 | Wiggins | H04L 12/4013 370/235 |
| 7,937,110 | B2* | 5/2011 | Wu | H04W 88/08 455/561 |
| 8,310,963 | B2* | 11/2012 | Singh | H04B 7/2609 370/280 |
| 8,532,242 | B2* | 9/2013 | Fischer | H04B 7/2606 375/356 |
| 8,693,342 | B2* | 4/2014 | Uyehara | H04B 7/024 370/238 |
| 8,743,756 | B2* | 6/2014 | Uyehara | H04B 1/18 370/252 |
| 8,837,659 | B2* | 9/2014 | Uyehara | H04J 3/0685 375/356 |
| 8,958,789 | B2* | 2/2015 | Bauman | H04B 10/25755 342/58 |
| 9,112,549 | B2* | 8/2015 | Stapleton | H04B 7/026 |
| 9,178,636 | B2* | 11/2015 | Fischer | H04J 3/00 |
| 9,219,520 | B2* | 12/2015 | Uyehara | H04B 7/024 |
| 9,420,628 | B2* | 8/2016 | Spedaliere | H04W 84/10 |
| 9,787,457 | B2* | 10/2017 | Zavadsky | H04W 88/085 |
| 10,020,850 | B2* | 7/2018 | Wala | H04W 24/00 |
| 2001/0037395 | A1* | 11/2001 | Sabat, Jr. | H04L 41/0213 709/229 |
| 2004/0004943 | A1* | 1/2004 | Kim | H04W 88/085 370/310 |
| 2005/0018630 | A1* | 1/2005 | Bianchi | H04L 12/2801 370/328 |
| 2007/0177552 | A1* | 8/2007 | Wu | H04W 88/08 370/335 |
| 2008/0063397 | A1* | 3/2008 | Hu | H04J 14/0282 398/43 |
| 2008/0074289 | A1* | 3/2008 | Sauder | G08G 1/07 340/909 |
| 2008/0232305 | A1* | 9/2008 | Oren | H04B 7/022 370/328 |
| 2009/0180407 | A1* | 7/2009 | Sabat | H04B 10/25754 370/280 |
| 2009/0180426 | A1* | 7/2009 | Sabat | H04W 88/085 370/328 |
| 2009/0196215 | A1* | 8/2009 | Sabat | H03G 3/3047 370/315 |
| 2009/0252139 | A1* | 10/2009 | Ludovico | H04W 16/32 370/342 |
| 2010/0266287 | A1* | 10/2010 | Adhikari | H04W 88/085 398/116 |
| 2011/0158081 | A1* | 6/2011 | Wang | H03F 1/304 370/201 |
| 2011/0201368 | A1* | 8/2011 | Faccin | H04B 7/0691 455/507 |
| 2011/0222467 | A1* | 9/2011 | Fujinnura | H03H 17/0664 370/316 |
| 2012/0027145 | A1* | 2/2012 | Uyehara | H04J 3/0685 375/356 |
| 2012/0106657 | A1* | 5/2012 | Fischer | H04B 7/2606 375/259 |
| 2012/0121240 | A1 | 5/2012 | Ueda | |
| 2012/0121249 | A1* | 5/2012 | Sabat, Jr. | H04B 10/25752 398/5 |
| 2012/0177026 | A1* | 7/2012 | Uyehara | H04B 1/18 370/345 |
| 2012/0257575 | A1* | 10/2012 | Davydov | H04B 7/024 370/328 |
| 2012/0314665 | A1* | 12/2012 | Ishida | H01Q 21/28 370/329 |
| 2012/0314824 | A1* | 12/2012 | Fujimura | H04B 1/1036 375/350 |
| 2013/0023285 | A1* | 1/2013 | Markhovsky | G01S 3/74 455/456.1 |
| 2013/0089336 | A1* | 4/2013 | Dahlfort | H04B 10/25759 398/115 |
| 2013/0095873 | A1* | 4/2013 | Soriaga | H04B 7/024 455/509 |
| 2013/0107763 | A1* | 5/2013 | Uyehara | H04B 7/024 370/278 |
| 2013/0114486 | A1* | 5/2013 | Spedaliere | H04W 84/10 370/311 |
| 2013/0114863 | A1 | 5/2013 | Kamata et al. | |
| 2013/0114963 | A1* | 5/2013 | Stapleton | H04W 24/02 398/115 |
| 2013/0121249 | A1* | 5/2013 | Ji | H04W 4/06 370/328 |
| 2013/0122830 | A1* | 5/2013 | Wang | H04B 17/391 455/78 |
| 2013/0128832 | A1* | 5/2013 | Kang | H04W 72/042 370/329 |
| 2013/0272441 | A1* | 10/2013 | Uyehara | H04B 1/18 375/267 |
| 2014/0050483 | A1* | 2/2014 | Berlin | H04B 7/2606 398/115 |
| 2014/0162713 | A1* | 6/2014 | Stapleton | H04W 88/085 455/509 |
| 2014/0169263 | A1* | 6/2014 | Stapleton | H04B 7/026 370/315 |
| 2014/0219140 | A1* | 8/2014 | Uyehara | H04B 7/024 370/278 |
| 2014/0226736 | A1* | 8/2014 | Niu | H04L 27/2628 375/260 |
| 2014/0241315 | A1* | 8/2014 | Niu | H04L 67/1091 370/331 |
| 2014/0269966 | A1* | 9/2014 | Faccin | H04B 7/0691 375/267 |
| 2015/0256358 | A1* | 9/2015 | Stapleton | H04W 52/245 370/329 |
| 2015/0303950 | A1* | 10/2015 | Shattil | H04B 1/0003 370/328 |
| 2015/0303998 | A1* | 10/2015 | Stapleton | H04B 7/022 375/267 |
| 2017/0250927 | A1* | 8/2017 | Stapleton | H04L 25/02 |

FOREIGN PATENT DOCUMENTS

| | | | | |
|---|---|---|---|---|
| EP | | 1047210 A2 * | 10/2000 | H04W 88/085 |
| EP | | 1047210 A2 * | 10/2000 | H04W 88/085 |
| WO | | 2012139781 A1 | 10/2012 | |
| WO | | 2013048526 A1 | 4/2013 | |
| WO | | 2013070614 A1 | 5/2013 | |

OTHER PUBLICATIONS

Written Opinion, dated Apr. 1, 2015, for International Patent Application No. PCT/US2014/072132, filed Dec. 23, 2014, 8 pages.

International Preliminary Report on Patentability for International Application No. PCT/US2014/072132, dated Jul. 7, 2016, 10 pages.

European Application No. EP14874737.1 , "Extended European Search Report", dated Jul. 11, 2017, 8 pages.

English Translation of Final Decision of Rejection for Japanese Application No. 2016-560881 dated Jul. 1, 2017, pp. all.

English translation of First Office Action for CN Application No. 201480070750.4, dated Sep. 17, 2019, pp. all.

Notice of Substantive Examination Result dated Jul. 19, 2019 for Indonesian Application No. P00201604818, pp. all.

\* cited by examiner

DIGITAL MULTIPLEXER IN A DISTRIBUTED ANTENNA SYSTEM

CROSS-REFERENCES TO RELATED APPLICATIONS

This application claims priority to U.S. Provisional Patent Application No. 61/920,397, filed on Dec. 23, 2013, entitled "Digital Multiplexer in a Distributed Antenna System," the disclosure of which is hereby incorporated by reference in its entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a cafeteria location in the building. At that time, a large number of subscribers have moved away from their offices and usual work areas. It's likely that during lunchtime there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

To address these issues, Distributed Antenna Systems (DAS) have been developed and deployed. Despite the progress made in DAS, there is a need in the art for improved methods and systems related to DAS.

SUMMARY OF THE INVENTION

The present invention generally relates to wireless communication systems employing Distributed Antenna Systems (DAS) as part of a distributed wireless network. More specifically, the present invention relates to a DAS utilizing software defined radio (SDR). Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access. Distributed Antenna Systems (DAS) provide a mechanism to route signals to various antennas that are distributed over a given geographical area. The signals typically originate from a base transceiver station (BTS), also referred to as a base station, at RF frequencies or digitally from a Baseband Unit (BBU). The BBU is part of a distributed Base Station system, whereby the Radio Unit (RU) is physically separated from the BBU. This kind of distributed architecture can increase flexibility of networking and decrease the cost of maintaining a network. Some common interface standards between the BBU and RU are OBSAI (Open Base Station Architecture Initiative) and CPRI (Common Public Radio Interface). The cellular payload data is transported between a plurality of BBUs and RUs at a high data rate. The BBU framed data is comprised of: payload IQ data, Control and Management (C&M) information, carrier frequency, signal bandwidth, etc. A common DAS platform that interfaces between both BBUs, at baseband, and BTSs, at RF, will simplify the distributed antenna system architecture.

According to an embodiment of the present invention, a system for routing signals in a Distributed Antenna System (DAS) is provided. The system includes one or more Base Band Units (BBUs). Each of the one or more BBUs has one or more digital outputs. The system also includes a plurality of Digital Multiplexer Units (DMUs) coupled to each other and operable to route signals between the plurality of DMUs. Each of the plurality of DMUs is operable to receive one or more digital inputs from the one or more BBUs. The system further includes a plurality of Digital Remote Units (DRUs) coupled to the plurality of DMUs and operable to transport signals between the plurality of DRUs and one or more of the plurality of DMUs.

According to another embodiment of the present invention, a method for routing signals in a Distributed Antenna System (DAS) including a plurality of Digital Multiplexer Units (DMUs) and a plurality of Digital Remote Units (DRUs) is provided. The method includes receiving, at ports of the plurality of DMUs, digital signals from sector ports of one or more Base Band Units (BBUs). The method also includes routing the digital signals between the plurality of DMUs and transporting the digital signals between the plurality of DMUs and a plurality of DRUs.

According to a specific embodiment of the present invention, a Distributed Antenna System (DAS) is provided. The DAS includes a plurality of Digital Multiplexer Units (DMUs) coupled to each other and operable to route signals between the plurality of DMUs. Each of the plurality of DMUs includes a plurality of digital input ports operable to receive digital inputs from one of more of a plurality of BBUs. Each of the plurality of BBUs includes a plurality of digital output ports. The DAS also includes a plurality of Digital Access Units (DAUs) coupled to each other and operable to route signals between the plurality of DAUs. Each of the plurality of DAUs includes a plurality of analog input ports operable to receive analog RF inputs from one of more of a plurality of BTSs. Each of the plurality of BTSs includes a plurality of analog RF output ports. The DAS further includes a plurality of Digital Remote Units (DRUs) coupled to the plurality of DMUs and operable to transport signals between DRUs and DMUs, each of the plurality of DRUs including a remote antenna.

According to a particular embodiment of the present invention, a system for routing signals in a Distributed Antenna System is provided. The system includes a plurality of Digital Multiplexer Units (DMUs). The plurality of DMUs are coupled and operable to route signals between the plurality of DMUs. The system also includes a plurality of Digital Remote Units (DRUs) coupled to the plurality of DMUs and operable to transport signals between DRUs and DMUs, a plurality of Base Band Units (BBU) with digital connections to the plurality of DMUs and operable to route signals between the plurality of DMUs and the plurality of digital connections.

Numerous benefits are achieved by way of the present invention over conventional techniques. For example, embodiments of the present invention provide methods and systems that utilize system elements with reduced hardware requirements (e.g., radio units in BTSs and radio units in DAUs), thereby reducing system cost, reducing system power consumption, and reducing system size. Additionally, embodiments described herein reduce or remove the requirement to perform RF to digital conversion and digital to RF conversion, thereby reducing signal degradation. These and other embodiments of the invention along with many of its advantages and features are described in more detail in conjunction with the text below and attached figures.

BRIEF DESCRIPTION OF THE DRAWINGS

Further objects and advantages of the present invention can be more fully understood from the following detailed description taken in conjunction with the accompanying drawings in which.

DETAILED DESCRIPTION OF THE INVENTION

Figure 1:
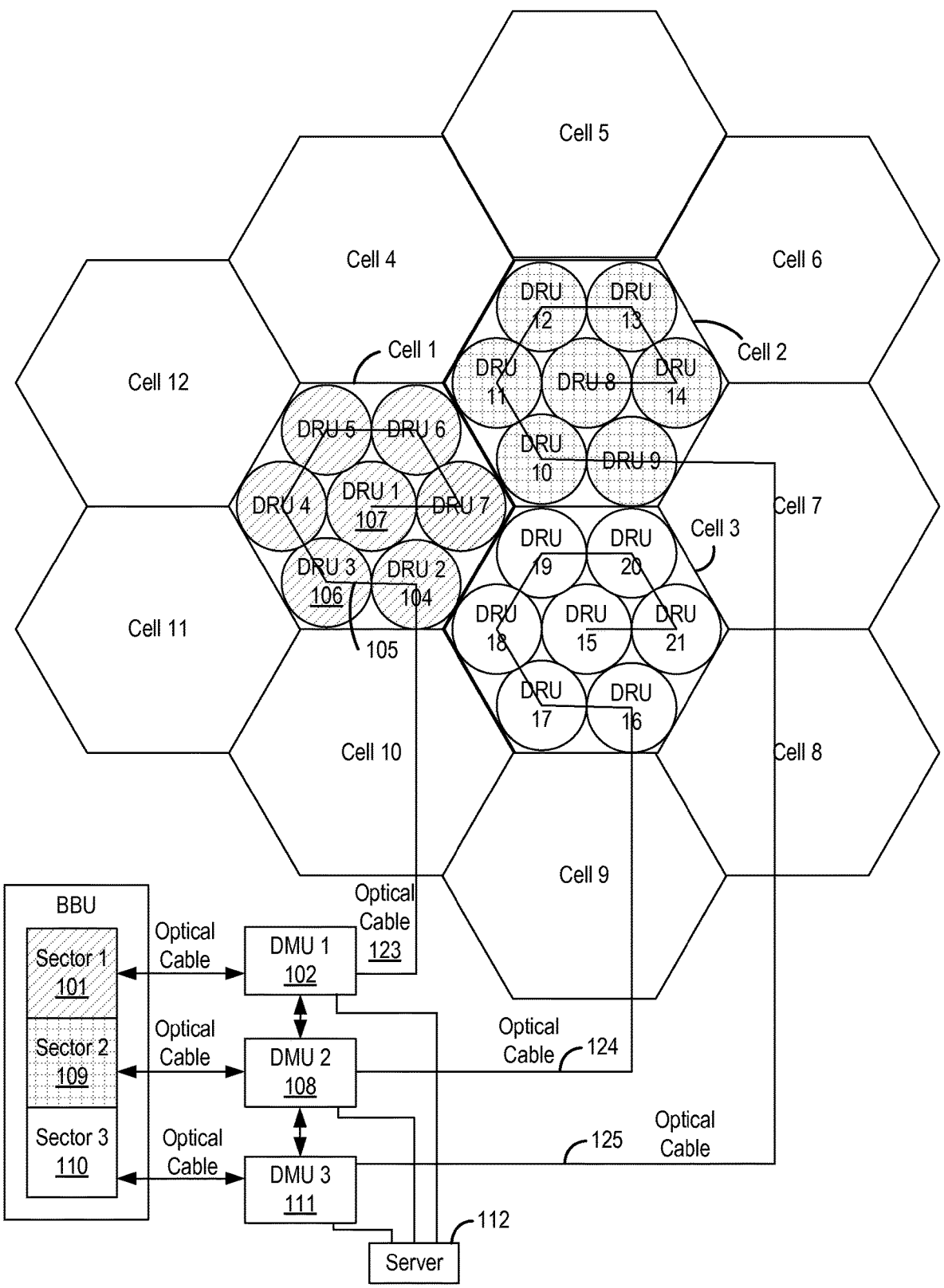
FIG. 1 is a block diagram according to one embodiment of the invention showing the basic structure and an example of the transport routing based on having a single 3 sector BBU with 3 DMUs and 7 DRUs daisy chained together for each cell.

A distributed antenna system (DAS) provides an efficient means of utilization of base station resources. The base station or base stations associated with a DAS can be located in a central location and/or facility commonly known as a base station hotel. A traditional DAS network includes one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs. A typical base station comprises 3 independent radio resources, commonly known as sectors. These 3 sectors are typically used to cover 3 separate geographical areas without creating co-channel interference between users in the 3 distinct sectors.

A Distributed Base Station Architecture involves the use of Base Band Units (BBUs) and many remotely located Radio Units (RUs). A number of standards exist for interfacing BBUs to RUs, some examples are OBSAI (Open Base Station Architecture Initiative) and CPRI (Common Public Radio Interface). Traditionally, a Distributed Base Station Architecture and a Distributed Antenna System (DAS) do not coexist on the same system. Typically, the distributed Base Station Architecture involves vendor specific infrastructure and cannot accommodate remote radio unit sharing. This poses a problem when venues have requirements that limit the number of antennas and remote units because of issues such as space constraints, esthetics constraints, etc. Infrastructure sharing is a means of reducing the number visible vendor specific units in a given outdoor or indoor venue. A Distributed Antenna System is preferably vendor and modulation agnostic in order to accommodate all the different vendor specific interfaces. Capturing the signals from the various vendor BTSs at RF is a means of ensuring that the DAS system will be agnostic. However, an active DAS system will digitize the RF signals and transport them to the remote units, whereby they will be translated back to RF. A Digital Access Unit (DAU) is the host unit that accepts the RF signals from the various BTSs.

The BTS includes a BBU and a collocated Radio Unit. The various Radio Units of multiple vendor BTSs interface to the DAUs at RF. A more efficient process would be to utilize a Digital Multiplexer Unit (DMU) that digitally interfaces directly to the vendor BBUs. This architecture would eliminate the requirement of the BTS to translate the signal to RF and then have the DAU translate the signal back to digital baseband. The net effect would be to remove any impairment that occurs through the translation process in addition to reducing the power consumption of this additional step. This DMU would be able to interface to the various vendor BBUs. The DMU serves another key function; it collates the various operator channels onto a single data stream that is sent to the various remote units. The remote unit radio channels are shared amongst the various operators. The reverse operation would occur in the DMU, whereby the received uplink signals from the various remote units are transported back to the DMU and then distributed to a specific BBU. An additional feature of the DMU is that it can interface to DAUs when a system has legacy BTS equipment that requires an RF interface.

An embodiment shown in FIG. 1 illustrates a basic DAS network architecture according to an embodiment of the present invention and provides an example of a data transport scenario between a 3 sector BBU and multiple DRUs. In this embodiment, the DRUs are daisy chained together to achieve coverage in a specific geographical area. Each individual sector covers an independent geographical area, which is identified as a Cell.

FIG. 1 depicts a DAS system employing multiple Digital Remote Units (DRUs) and multiple Digital Multiplexer Units (DMUs). In accordance with the present invention, each DRU provides unique header information associated with each DRU which uniquely identifies uplink data received by that particular Digital Remote Unit.

One feature of embodiments of the present invention is the ability to route Base Station radio resources among the DRUs or group(s) of DRUs. In order to route radio resources available from one or more Base Stations, it is desirable to configure the individual router tables of the DMUs and DRUs in the DAS network.

The DMUs 102, 108, and 111 are networked together to facilitate the routing of DRU signals among the multiple DMUs. The DMUs support the transport of the RF downlink and RF uplink signals between the BBU and the DRUs. This architecture enables the various base band unit signals to be transported simultaneously or concurrently to and from multiple DRUs. PEER ports are used for interconnecting DMUs and interconnecting DRUs in some embodiments.

The DMUs have the capability to control the gain (in small increments over a wide range) of the downlink and uplink signals that are transported between the DMU and the base band unit (or base band units) connected to that DMU. This capability provides flexibility to simultaneously control the uplink and downlink connectivity of the path between a particular DRU (or a group of DRUs via the associated DMU or DMUs) and a particular base band unit sector.

Embodiments of the present invention use router tables to configure the networked DMUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream.

As shown in FIG. 1, the individual base band unit sector's radio resources are transported to a daisy-chained network of DRUs. Each individual sector's radio resources provide coverage to an independent geographical area via the networked DRUs. FIG. 1 demonstrates how three cells, each cell comprising an independent network of 7 DRUs, provide coverage to a given geographical area. A server 112 is utilized to control the switching function provided in the DAS network. Referring to FIG. 1 and by way of example, DMU 1 (102) receives digital downlink signals from BBU Sector 1 (101). DMU 1 collates the baseband signals from the other DMUs onto a serial stream and the optical fiber cable 123 transports the desired digital signals to DRU 2 (104). Optical cable 105 transports all the digital optical signals to DRU 3 (106). The other DRUs in the daisy chain are involved in passing the optical signals onward to DRU 1 (107). Thus, embodiments of the present invention provide the ability to receive digital signals from a plurality of sectors of a BBU of a base station (e.g., Sector 1 (101), Sector 2 (109), and Sector 3 (110). The digital signals are received by one or more DMUs, which are connected to each other and controlled by server 112 so that the digital signals can be routed between the DMUs. The digital signals, which may be processed at the DMU, are then routed to the digital remote units, illustrated by DRU1 through DRU21 in FIG. 1.

DMU 1 (102) is networked with DMU 2 (108) and DMU 3 (111) to allow the downlink signals from Sector 2 (109) and Sector 3 (110) to be transported to all the DRUs in Cell 1. The system's switching and routing functions enable the selection of which sectors' signals are transmitted and received by each DRU. DMU 2 (108) is connected to Cell 3 (DRUs 15-21) using optical cable 124 and DMU 3 (111) is connected to Cell 2 (DRUs 8-14) using optical cable 125.

Because the DMUs receive digital signals from the base band units, for example, over optical fiber, although other communications media can be used, they are able to process the received digital signals and transmit digital signals to the DRUs for broadcast as RF signals to users. Although embodiments of the present invention discuss receiving and transmitting digital signals, it is not necessary that these digital signals be identical since processed versions of received digital signals can be transmitted, which can also be referred to as digital signals. As an example, digital signals can be received at DMU 1 (102) from sector 1 (101) as well as from Sector 2 (109) through DMU 2 (108). These digital signals can be combined into a single digital signal for transport to Cell 1. Thus, although the specification and claims refer to digital signals at various stages of the communication process, it is not required that these digital signals are identical. One of ordinary skill in the art would recognize many variations, modifications, and alternatives.

As illustrated in FIG. 1, the DMUs receive digital signals from the sectors of the BBU, and then direct those digital signals to the various DRUs. It should be noted that although embodiments of the present invention discuss receiving a digital signal, for example, from a BBU, and transmitting the digital signal to the DRUs, for example, through the DMU, the digital signal that is transmitted to the DRUs does not have to be identical to the digital signal that is received from the BBU. As an example, as discussed above, multiple signals from multiple sectors can be combined at the DMU for transmission of the combined signal to the DRUs. Additional description related to DAS are provide in U.S. Patent Application Publication No. 2013/0114963, published on May 9, 2014, the disclosure of which is hereby incorporated by reference in its entirety for all purposes.

Figure 2:
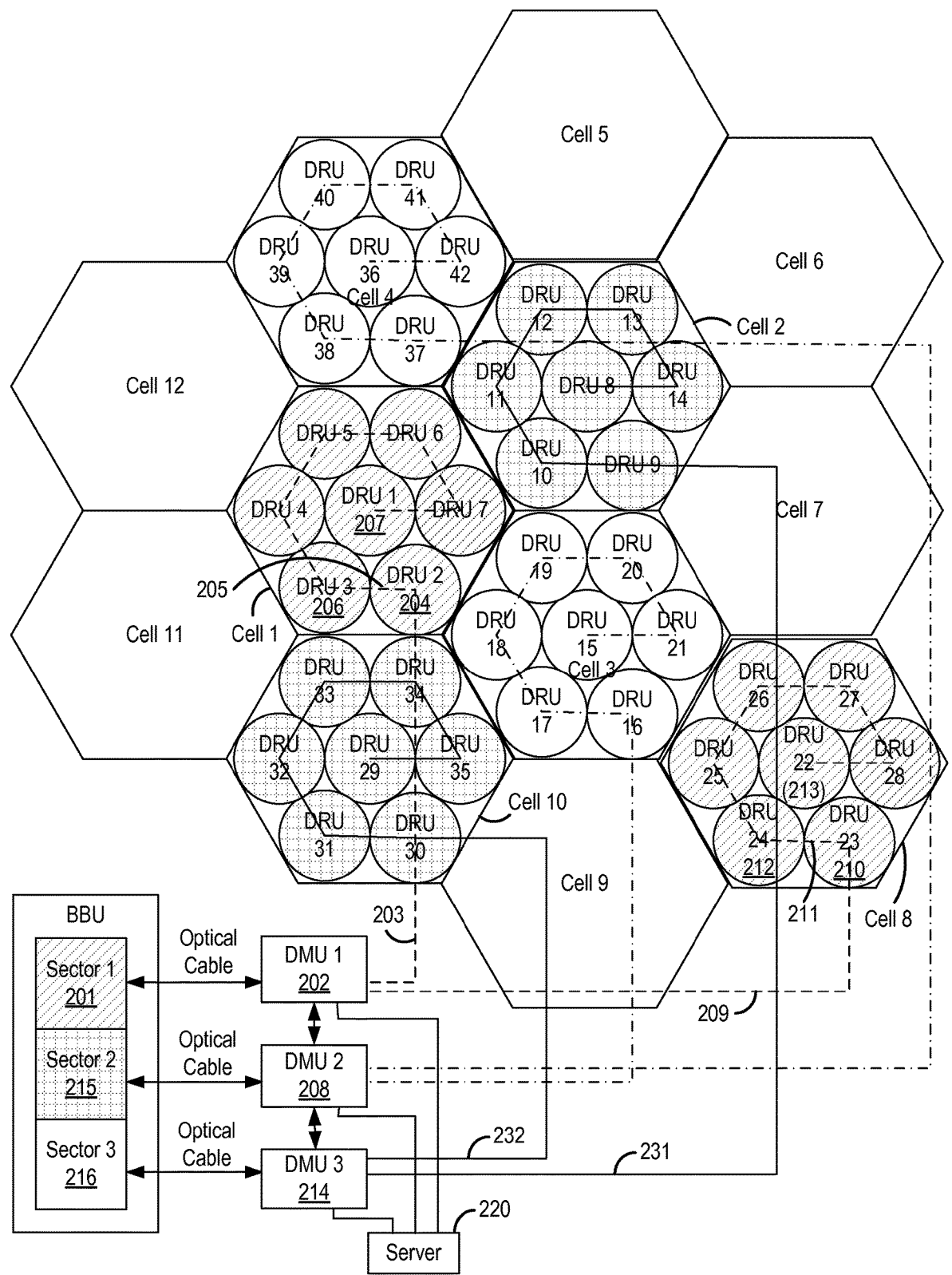
FIG. 2 is a block diagram according to one embodiment of the invention showing the basic structure for a frequency reuse pattern of N=1 and an example of the transport routing based on having a single 3 sector BBU with 3 DMUs and 7 DRUs daisy chained together for each cell.

FIG. 2 shows an embodiment illustrating how a single BBU can be used to provide coverage for a larger geographical area when a frequency reuse pattern of N=1 is used. Referring to FIG. 2, cell 1 and cell 8 would share the radio resources of sector 1 (201) of the BBU. Similarly, cell 2 and cell 10 would share the radio resources of sector 3 (216), which are connected to DMU 214 via optical cables 231 and 232, respectively.

The DMUs control the routing of data between the BBU and the DRUs. Each individual data packet is provided with a header that uniquely identifies which DRU it is associated with. The DMUs are interconnected, for example, using optical fiber, to allow transport of data among multiple DMUs. This feature provides the unique flexibility in the DAS network to route signals between the sectors of a BBU and the individual DRUs. A server 220 is utilized to control the switching function provided in the DAS network.

Referring to FIG. 2, and by way of example, DMU 1 (202) receives downlink signals from BBU 1 Sector 1 (201). DMU 1 collates the baseband signals from the other DMUs onto a serial stream and the optical fiber cable 203 transports the desired signals to DRU 2 (204) in Cell 1. Optical cable 205 transports all the optical signals to DRU 3 (206). The other DRUs in the daisy chain are involved in passing the optical signals onward to DRU 1 (207). DMU 1 (202) is networked with DMU 2 (208) and DMU 3 (214) to allow the downlink signals from Sector 2 and Sector 3 to be transported to all the DRUs in Cell 1.

Similarly for Cell 8, optical fiber cable 209 transports the desired signals from DMU 1 (202) to DRU 23 (210). Optical cable 211 transports all the optical signals to DRU 24 (212). The other DRUs in the daisy chain in Cell 8 are involved in passing the optical signals onward to DRU 22 (213). Because of frequency reuse, DMU 1 (202) is able to pass signals to multiple cells in a star configuration as illustrated in FIG. 2 via the multiple optical cables connected to the multiple optical outputs of the DMUs.

Figure 3:
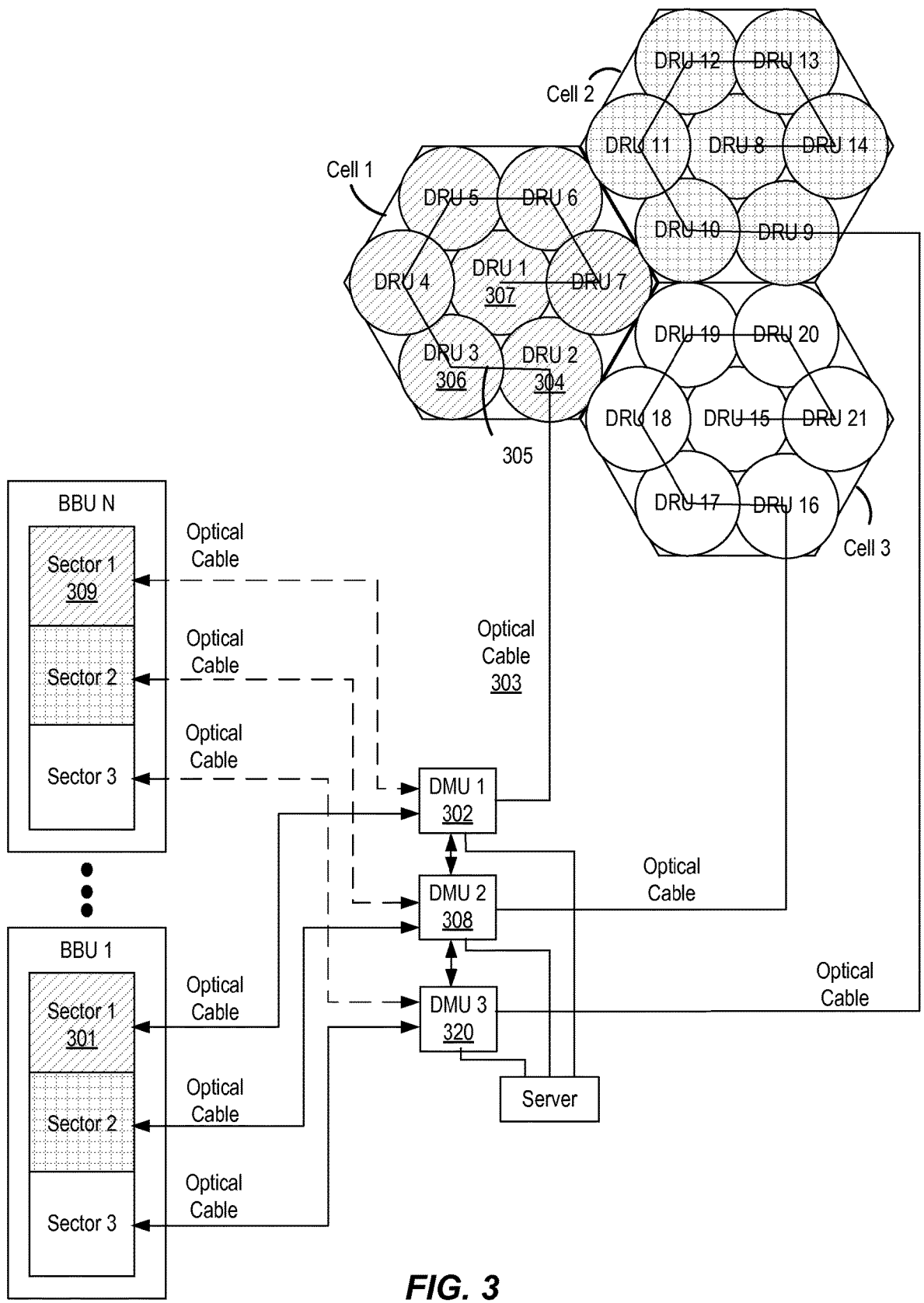
FIG. 3 is a block diagram according to one embodiment of the invention showing the basic structure and an example of the transport routing based on having multiple 3 sector BBUs with 3 DMUs and 7 DRUs daisy chained together for each cell.

FIG. 3 shows an embodiment illustrating an application employing a BBU hotel where N BBUs are interconnected to serve a given geographical area. The BBUs may represent independent wireless network operators and/or multiple interface standards (CPRI, OBSAI, etc.). As illustrated in FIG. 3, multiple three-sector BBUs are connected to a daisy chained DAS network in which each DMU utilizes multiple optical inputs and a single optical output connected to a given cell. Thus, different operators or different bands can be represented by the different sectors of a BBU. Although it is not illustrated in FIG. 3 for purposes of clarity, the DMUs can have multiple inputs as illustrated in FIG. 3 as well as multiple outputs as illustrated in FIG. 2. Accordingly, multiple input applications in which multiple digital inputs from different BBUs are received and multiple output applications in which multiple digital outputs are provided at the DMU are included within the scope of the present invention.

Referring to FIG. 3 and by way of example, DMU 1 (302) receives downlink signals from BBU Sector 1 (301). DMU 1 (302) transports the desired signals to DRU 2 (304). Optical cable 305 transports all the optical signals to DRU 3 (306). The other DRUs in the daisy chain are involved in passing the optical signals onward to DRU 1 (307). DMU 1 (302) is networked with DMU 2 (308) to allow the downlink signals from BBU 1 Sector 2 (320) to be transported to all the DRUs in Cell 1. DMU 1 (302) receives downlink signals from BBU Sector N (309). DMU 1 (302) collates all the downlink signals from the various BBUs and DMUs.

In order to efficiently utilize the limited BBU resources, the network of DRUs should have the capability of redirecting their individual uplink and downlink signals to and from any of the BBU sectors. Because the DRUs data traffic has unique streams, the DMU Router has the mechanism to route the signal to different BBUs.

Figure 4:
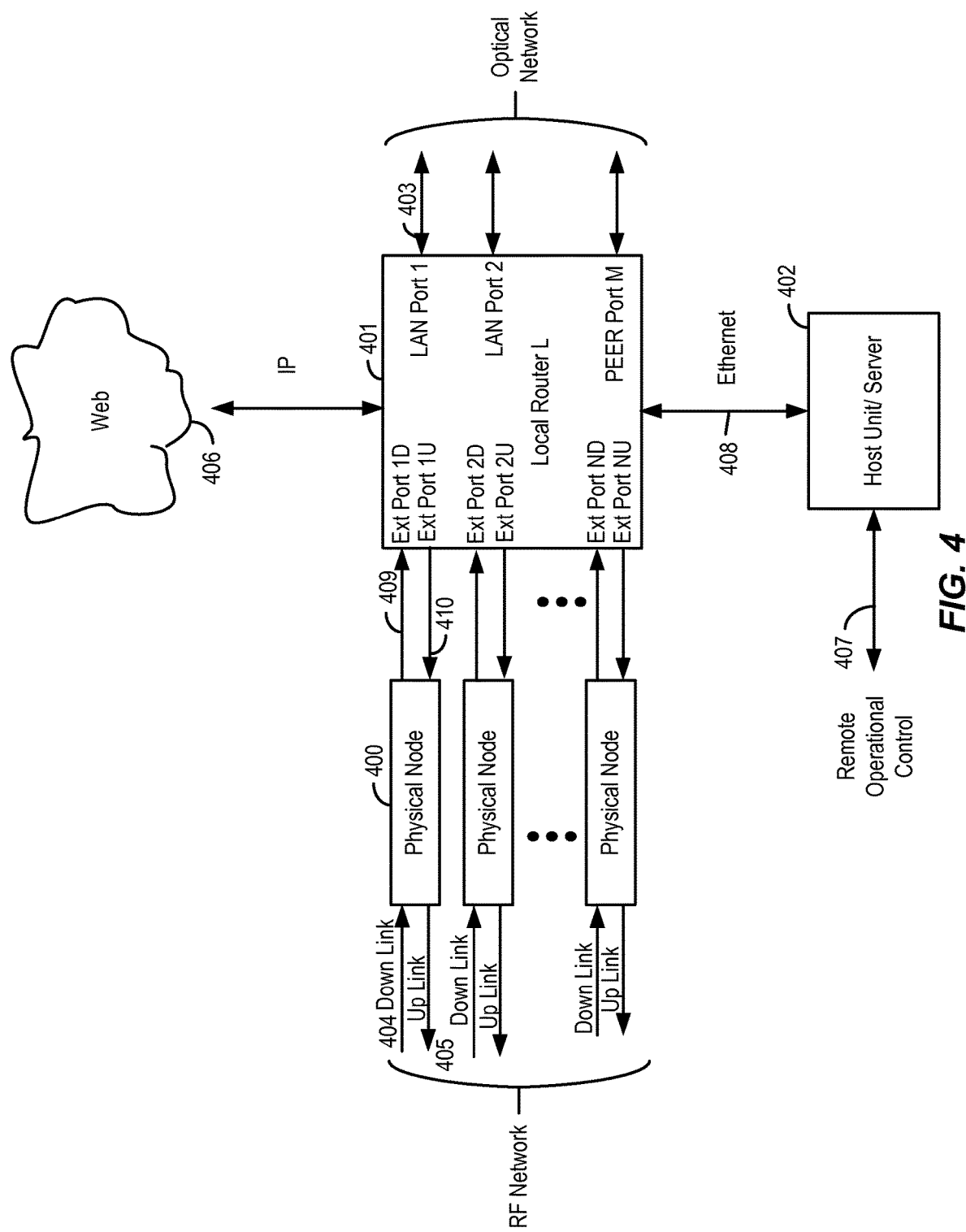
FIG. 4 is a block diagram of a Digital Access Unit (DAU), which contains Physical Nodes and a Local Router according to an embodiment of the present invention.

FIG. 4 shows the 2 primary elements in a DAU, the Physical Nodes (400) and the Local Router (401). The Physical Nodes translate the RF signals to baseband for the Downlink and from baseband to RF for the Uplink. The Local Router directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration. In comparison with the DMU illustrated in FIG. 8, the physical nodes 400 are not utilized in the DMU illustrated in FIG. 8 in some embodiments.

FIG. 4 shows an embodiment of the DAU whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U (uplink) ports. Similarly, the router directs the downlink data stream from the External D (downlink) ports to the selected LAN and PEER ports.

In one embodiment, the LAN and PEER ports are connected via an optical fiber to a network of DMUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port. Additional description related to DAUs is provided in U.S. Patent Application Publication No. 2013/0114963, incorporated by reference above.

Figure 5:
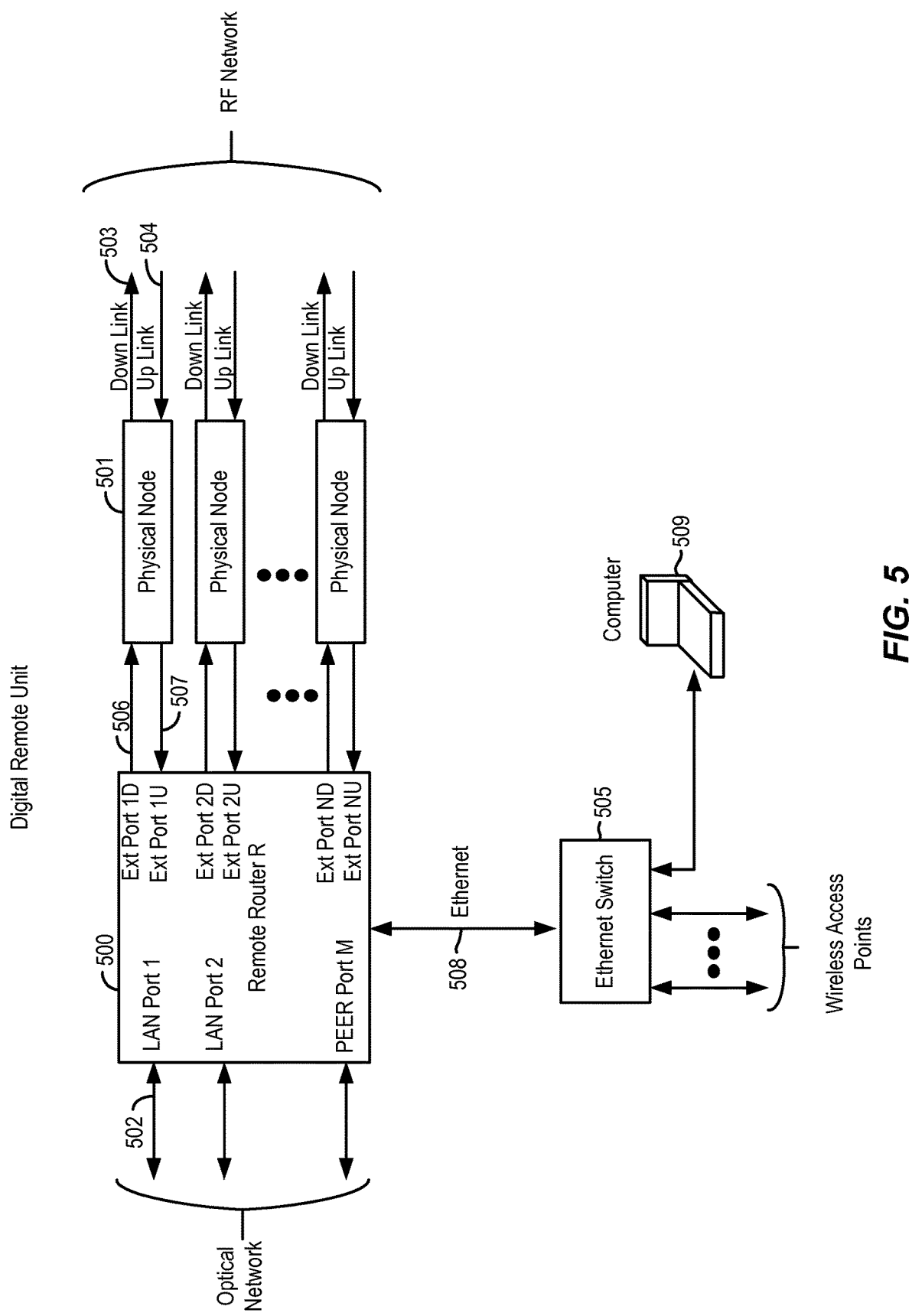
FIG. 5 is a block diagram of a Digital Remote Unit (DRU) according to an embodiment of the present invention.

FIG. 5 shows the 2 primary elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the BTS at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains a Ethernet Switch (505) so that a remote computer or wireless access points can connect to the internet. Additional description related to DRUs is provided in U.S. Patent Application Publication No. 2013/0114963, incorporated by reference above.

Figure 6:
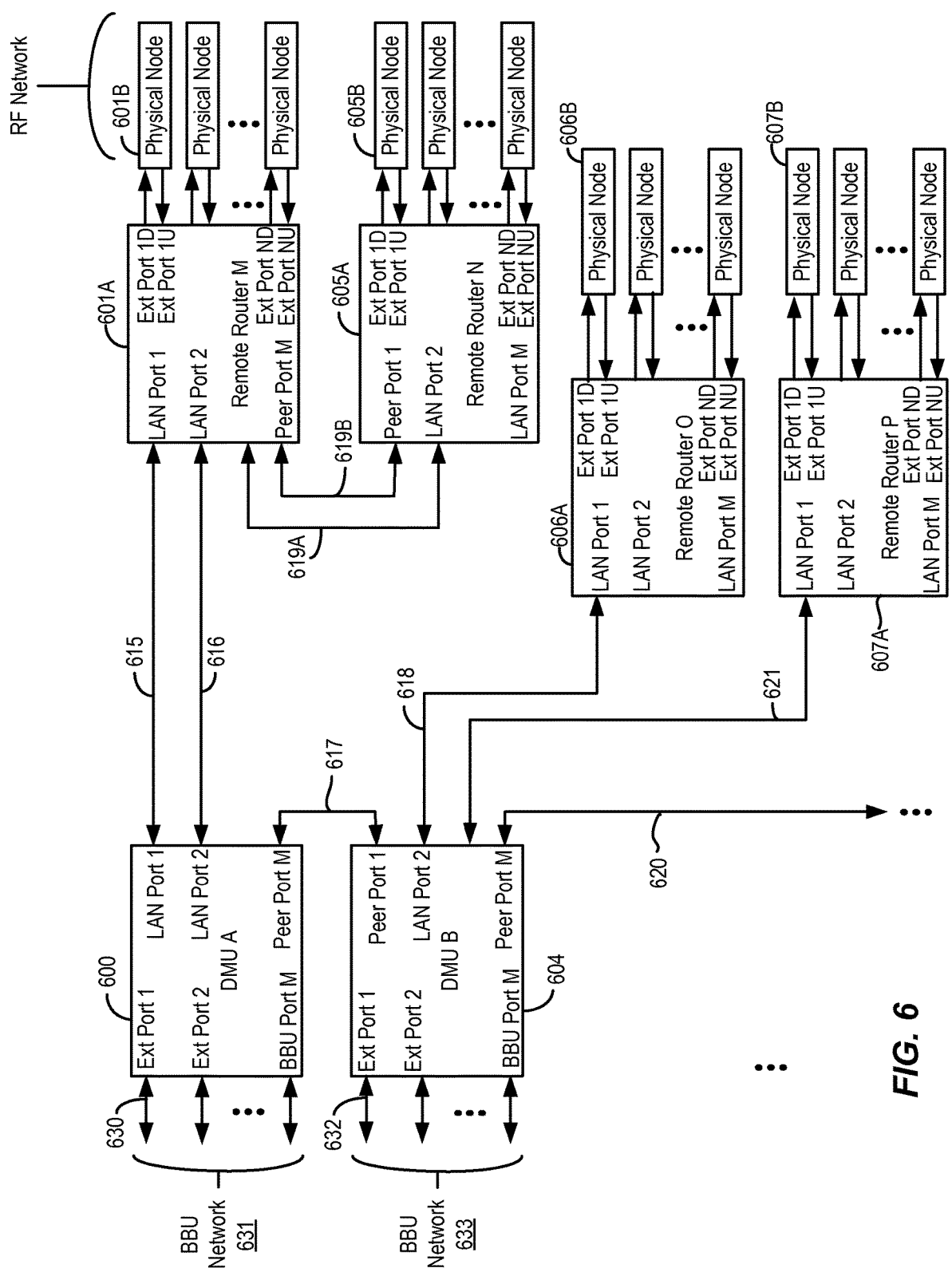
FIG. 6 depicts a typical topology where multiple Local Routers (DMUs and DAUs) are interconnected with multiple Remote Routers according to an embodiment of the present invention.
Figure 6:
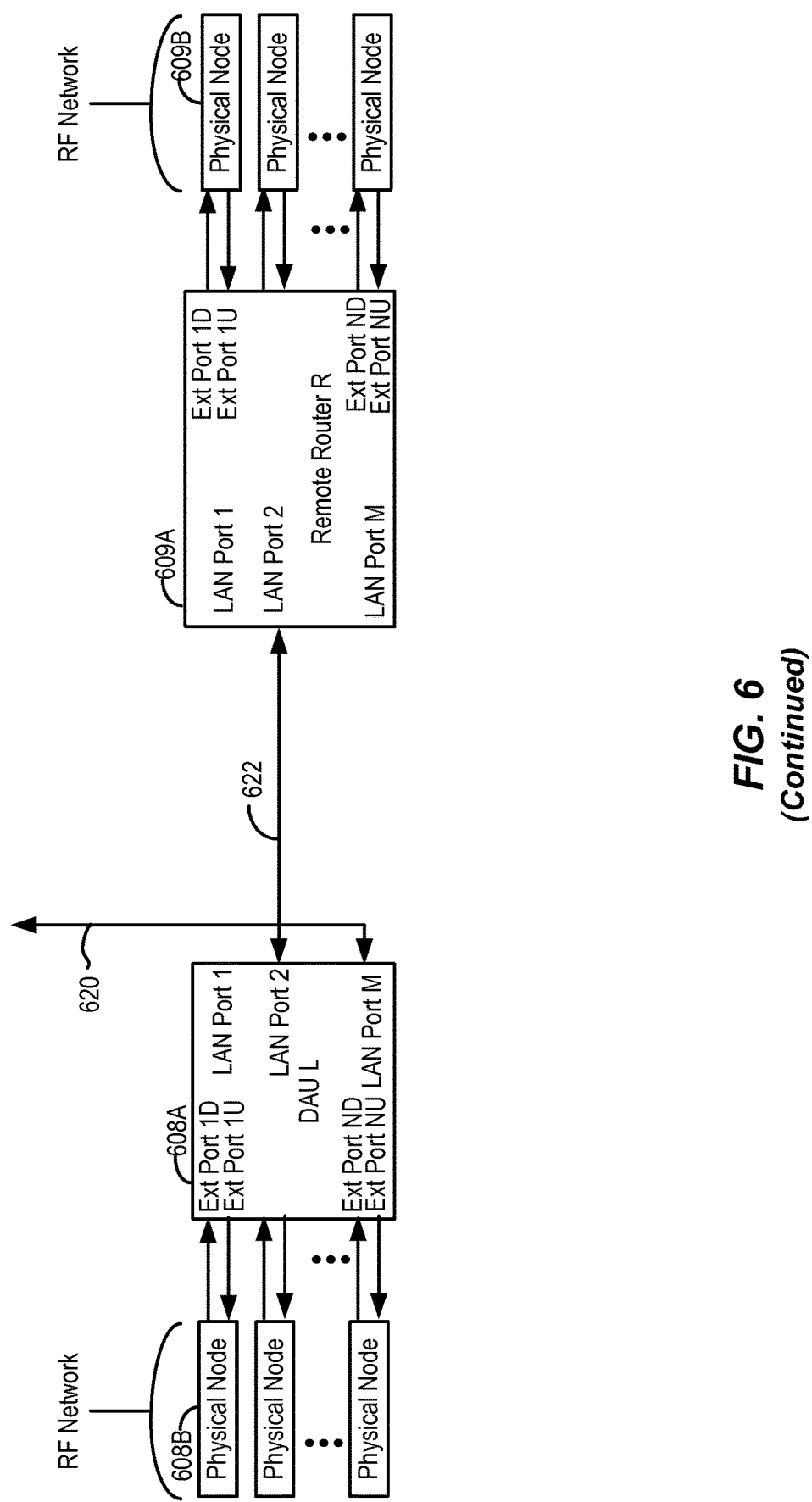

FIG. 6 depicts a DAS network that includes multiple DMUs, one or more DAUs, and multiple DRUs in an DMU and DAU network topology. The Local Routers, illustrated by DMU A and DMU B, and DAU L, are shown in a Daisy Chain configuration. Although a single DAU is illustrated for purposes of clarity, additional DAUs can be utilized in this implementation. The Remote Routers, illustrated by portions of DRUs 601, 605, 606, 607, and 609, are shown in a star and/or daisy chain configuration. By comparison with FIG. 5, it can be seen that the remote router 601A and the physical node 601B are both components of the DRU. The local routers in the DMUs and DAUs can be interconnected via a PEER port, illustrated by optical cables 617 and 620. The Local routers can connect to the remote routers in the DRUs via an optical, copper, or other suitable connection. The remote routers in the DRUs can be connected in a daisy chain configuration with other DRUs or they may be connected with a local router via a star configuration. The PEER ports in a DMU are used when there is no direct connection between a physical node connected to a local router (e.g., DMU) and a physical node connected to a remote router (e.g., DRU). PEER ports at the DRU are used for daisy chaining between two or more DRUs. DMUs 600/604 receive digital signals from BBU networks 631/633 via optical cables 630/632. DMU 600 is connected to DRU 601 via optical cable 615 and 616. DRU 605 is connected to DRU 605 via optical cables 619A and 619B. DMU 604 is connected to DRUs 606 and 607 in a star configuration using optical cables 618 and 621. DAU 608 is connected to DRU 609 via optical cable 622.

Figure 7:
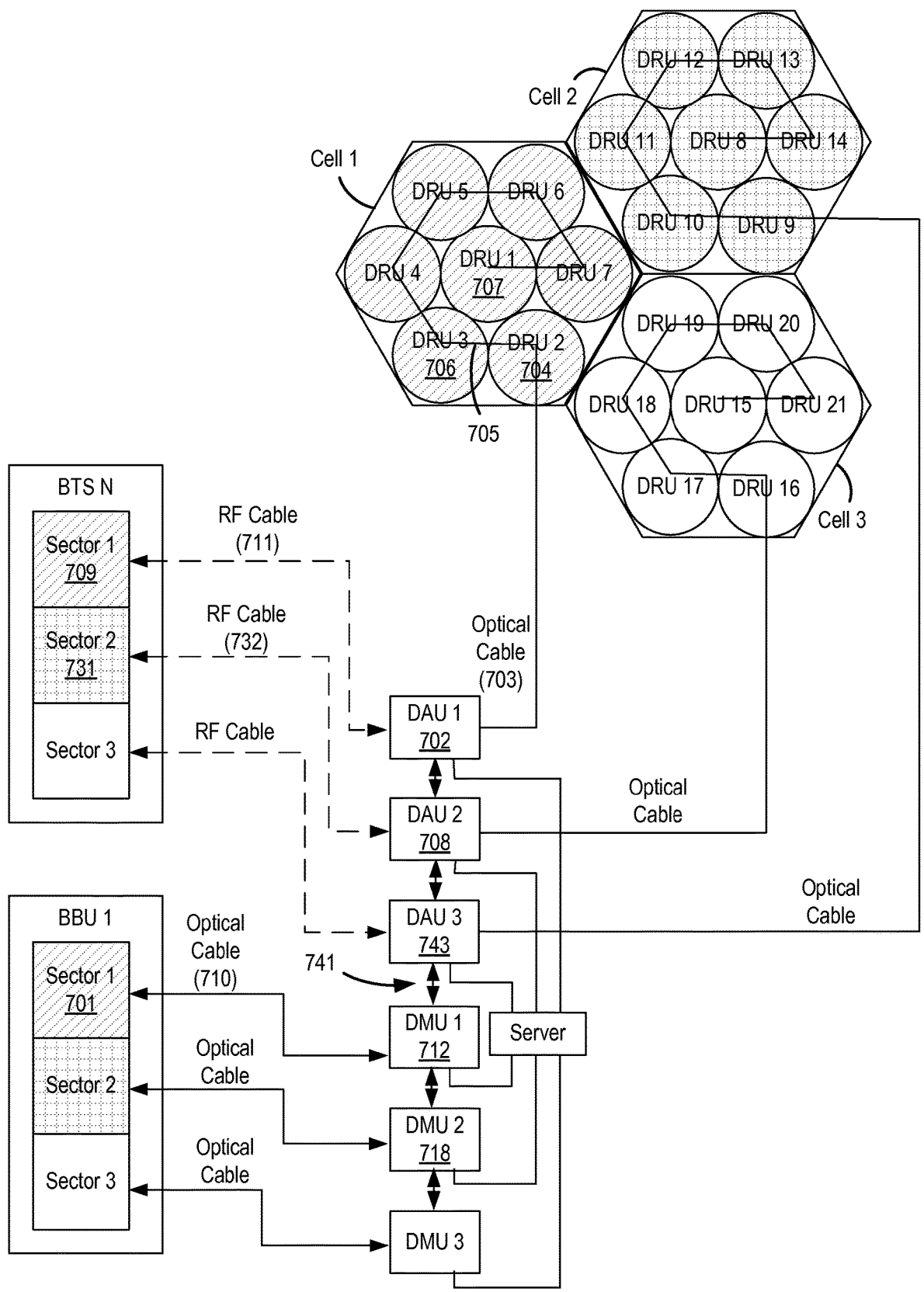
FIG. 7 shows a block diagram of the interconnection between a BTS to DAUs and a BBU to DMUs.

FIG. 7 shows an embodiment illustrating an application employing a base station/base band unit hotel where multiple BTSs and BBUs can be interconnected to serve a given geographical area. As will be evident to one of skill in the art, FIGS. 6 and 7 provide illustrations of related network topologies in which digital signals are received by DMUs 600/604 from BBUs via optical cables and RF signals are received by DAU(s) 608 from BTS(s) via RF cables. In the embodiment illustrated in FIG. 7, one or more three-sector BTSs and one or more three-sector BBUs can be connected to a Daisy Chained DAS network. The BBUs may represent independent wireless network operators, multiple bands, and/or multiple interface standards (CPRI, OBSAI, etc.). The BTSs may represent independent wireless network operators and interface with DAUs at RF. Referring to FIG. 7 and by way of example, DAU 1 (702) receives downlink signals from BTS N Sector 1 (709) via RF cable 711. DAU 1 (702) transports the desired signals to DRU 2 (704) via optical cable 703. Optical cable 705 transports all the optical signals to DRU 3 (706). The other DRUs in the daisy chain are involved in passing the optical signals onward to DRU 1 (707). DAU 1 (702) is networked with DAU 2 (708) to allow the downlink signals from BTS N Sector 2 to be transported to all the DRUs in Cell 1. DAU 2 (708) receives downlink signals from BTS Sector N (709) via DAU 1 as well as from BTS Sector 2 (931) via RF cable 732.

DMU 1 (712) interfaces to BBU 1 sector 1 (701). DMU 1 is interconnected with DAU 3 743 via optical cable 741. The networking of the DAUs to the DMUs provides a mechanism to collate signals from BTSs with signals from BBUs. Accordingly, analog RF signals from the BTS(s) and digital optical signals from the BBU(s) can be routed to desired DRUs using the topology illustrated in FIG. 7.

As illustrated in FIG. 7, analog signals from BTSs and digital signals from BBUs can be received by the DAS network by using DAUs and DMUs, respectively. Accordingly, the DAS system provided by embodiments of the present invention can be considered as input signal agnostic, since it can receive digital inputs from the BBU networks as well as analog RF inputs from the BTS and then communicate those signals through the system to the remote antennas. Of course, in the uplink path, the system can receive inputs at the remote antennas and then communicate those signals in either digital or analog format to the BBUs or DAUs.

Figure 8:
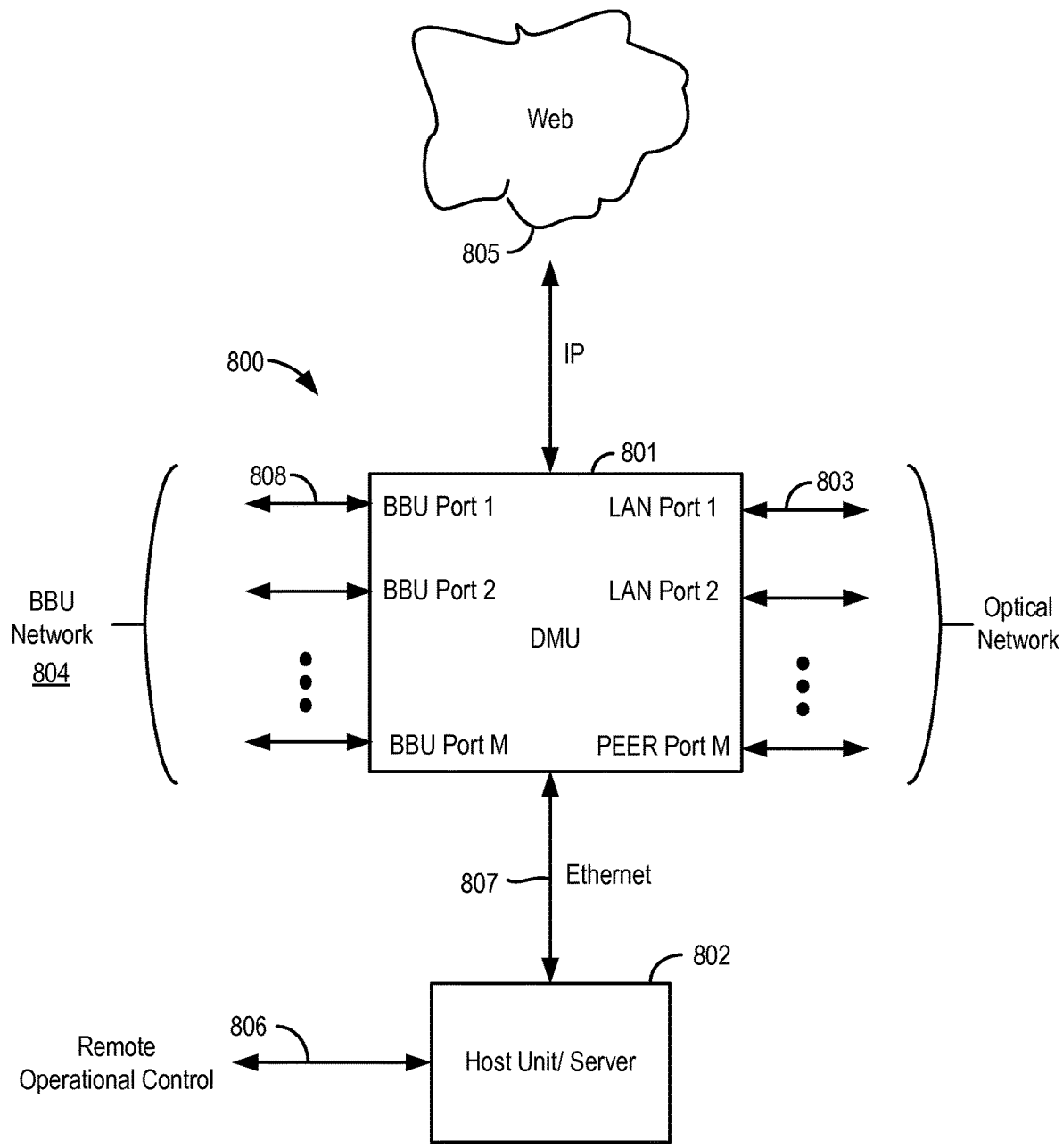
FIG. 8 is a block diagram of a Digital Multiplexer Unit (DMU) according to an embodiment of the present invention.

FIG. 8 shows a block diagram of a Digital Multiplexer Unit (DMU). The DMU 800 includes both a Router and BBU interface nodes. The Router directs the traffic between the LAN ports, BBU Ports and PEER Ports. The BBU nodes can be used for different operator BBU equipment. The router directs the uplink data stream from the LAN and PEER ports to the selected BBU ports. Similarly, the router directs the downlink data stream from the BBU ports to the selected LAN and PEER ports. The BBU port translates the uplink signals destined for its specific port to the interface standard used by the BBU connected to that specific port. Similarly, the downlink signal from a BBU port is translated from the specific BBU protocol standard to a common baseband signal used to collate the various downlink signals. The DMU also contains an Ethernet port (802) so that a remote computer or wireless access points can connect to the internet. The LAN ports of the DMU interface to the various DRUs connected to the DMU. The PEER ports are used to interface to other DMUs or DAUs.

The DMU differs from a DAU in several respects. For a DAU, the interface to the base station is via RF, that is, analog RF signals being received at the DAU. Since the base station includes two entities: a base band unit (BBU), which performs digital baseband signal processing, and an RF unit, which can also be referred to as a radio unit. In systems using a DAU, the BBU passes the digital signal to the RF unit, which upconverts the signal to RF and provides the signal to the DAU, which then converts the RF signal to a digital signal. Embodiments of the present invention, use the DMU to receive the digital signal from the BBU, removing the process of digital to RF conversion followed by RF to digital conversion. Thus, embodiments use the DMU, which provides a digital interface directly to the BBU, thereby bypassing the radio unit in the BTS and bypassing the RF portion present in a DAU.

As discussed in relation to FIG. 1, signal processing may be performed on the digital signals received from the BBU, for example, at BBU port 1, before the digital signals are transmitted to the DRUs through, for example, LAN port1. Thus, the digital signals received at the BBU ports do not have to be identical to the digital signals transmitted at the LAN ports. Accordingly, the use of the term digital signals herein includes implementations in which digital signals are received, processed by the DMU, and the digital signals are transmitted, not requiring that the received and transmitted digital signals are identical. One of ordinary skill in the art would recognize many variations, modifications, and alternatives.

Referring once again to FIG. 8, inputs 808 are digital inputs from the BBU network and outputs 803 are digital outputs to the DRUs. In addition to signals from the BBU network, the DMU 800 also is able to receive IP traffic from the internet 805 or other source of IP data. Accordingly, both cellular traffic from the BBU network and IP traffic from the internet can move both upstream and downstream through the DMU as illustrated in FIG. 8.

Figure 9:
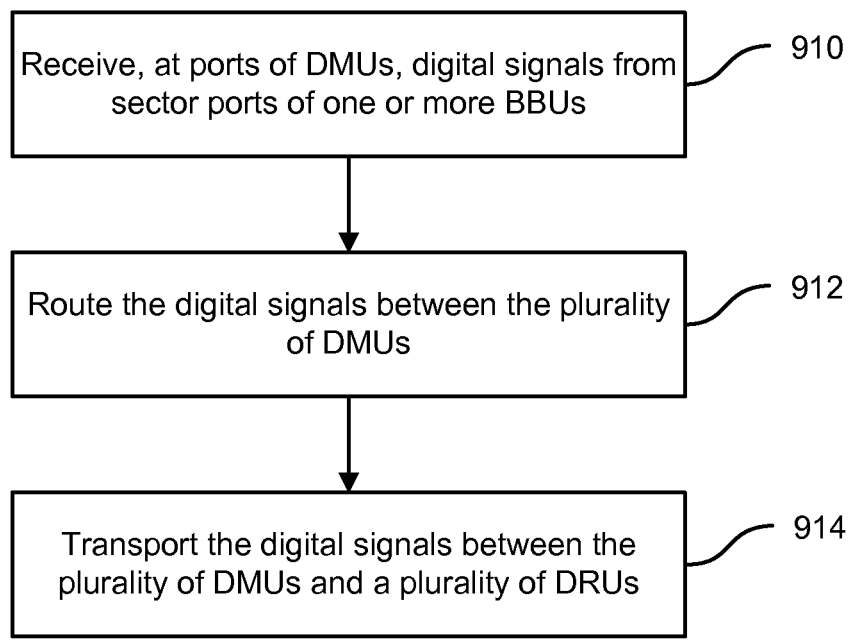
FIG. 9 is a simplified flowchart illustrating a method of routing signals in a DAS according to an embodiment of the present invention.

FIG. 9 is a simplified flowchart illustrating a method of routing signals in a DAS according to an embodiment of the present invention. The DAS includes a plurality of Digital Multiplexer Units (DMUs) and a plurality of Digital Remote Units (DRUs). The method includes receiving, at ports of the plurality of DMUs, digital signals from sector ports of corresponding Base Band Units (BBUs). The ports of the DMU are input/output ports that send and receive digital signals, which may be digital optical signals. The sector ports of the BBUs are associated with sectors of the BBU and are also input/output ports that send and receive digital signals, which may be digital optical signals.

The method also includes routing the digital signals between the plurality of DMUs. As illustrated herein, the DMUs are coupled to each other, for example, at PEER ports, using optical fiber, enabling communication between the DMUs. Routing of the digital signals between the plurality of DMUs can include collating a first digital signal received from a first BBU and a second digital signal received from a second BBU. The digital signals, which can, for example, be associated with Sector 1 of the first BBU and Sector 1 of the second BBU, can then be routed as a combined signal. In this embodiment, the collated digital signal is directed to one of the plurality of DRUs, where the signals can be processed and broadcast using the remote antennas.

The method includes transporting the digital signals between the plurality of DMUs and a plurality of DRUs. The coupling of the DMUs and the DRUs, for example, using optical fiber, enables the digital signals received from the BBUs to be transported to the DRUs and for signals received at the DRUs to be transported to the BBUs.

In some embodiments, routing the digital signals between the DMUs comprises using routing tables. These routing tables can be stored or otherwise provided at a server coupled to the plurality of DMUs. In another implementation, the routing tables are stored or otherwise provided at one or more of the DRUs. The routing tables can include Merge Blocks that facilitate merging of signals received at multiple DRUs. In an embodiment, a power level of each carrier in each DRU is independently controlled, improving system performance.

It should be appreciated that the specific steps illustrated in FIG. 9 provide a particular method of routing signals in a DAS according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments of the present invention, router tables are used to configure the networked DAUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream. Additional description related to router tables is provided in U.S. Patent Application Publication No. 2013/0114963, incorporated by reference above.

As an example, the amount of radio resources (such as RF carriers, the power level of each carrier, LTE Resource Blocks, CDMA codes or TDMA time slots) assigned to a particular DMU/DRU or group of DMUs/DRUs can be set via software control to meet desired capacity and throughput objectives or wireless subscriber needs. Applications of the present invention are suitable to be employed with distributed base stations, distributed baseband units, distributed antenna systems, distributed repeaters, mobile equipment and wireless terminals, portable wireless devices, and other wireless communication systems such as microwave and satellite communications.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ACLR Adjacent Channel Leakage Ratio
ACPR Adjacent Channel Power Ratio
ADC Analog to Digital Converter
AQDM Analog Quadrature Demodulator
AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator
LPF Low Pass Filter
MCPA Multi-Carrier Power Amplifier
MDS Multi-Directional Search
OFDM Orthogonal Frequency Division Multiplexing
PA Power Amplifier
PAPR Peak-to-Average Power Ratio
PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit
SAW Surface Acoustic Wave Filter
UMTS Universal Mobile Telecommunications System
UPC Up Converter
WCDMA Wideband Code Division Multiple Access
WLAN Wireless Local Area Network

What is claimed is:

1. A system for routing signals in a Distributed Antenna System, the system comprising:
  one or more Base Band Units (BBUs), each of the one or more BBUs having one or more digital outputs;
  a plurality of Digital Multiplexer Units (DMUs), each of the plurality of DMUs including a peer port and being coupled to at least one of the plurality of DMUs and operable to route signals through the peer port, wherein each of the plurality of DMUs comprises one or more digital input ports operable to receive one or more digital inputs from the one or more BBUs and a plurality of digital output ports;
  one or more Base Transceiver Stations (BTSs), each one of the BTSs having one or more radio frequency (RF) outputs;
  a plurality of Digital Access Units (DAUs), each of the plurality of DAUs including an RF port operable to receive the RF outputs from one or more of the BTSs, convert the RF outputs into digital BTS signals, collate the digital BTS signals with one or more of the digital signals from the plurality of DMUs, and transport the collated digital BTS signals and the one or more of the digital signals to one of the plurality of DRUs, wherein each DAU is coupled to at least one of the plurality of DAUs and at least one DAU of the plurality of DAUs is coupled to at least one of the plurality of DMUs and operable to route signals between the plurality of DMUs and the plurality of DAUs; and a plurality of Digital Remote Units (DRUs), each of the plurality of DRUs being coupled to at least one of the plurality of DMUs and coupled to at least one of the plurality of DAUs, wherein the plurality of DRUs are operable to transport signals between the plurality of DRUs and the at least one of the plurality of DMUs and DAUs.

2. The system of claim 1, wherein each of the one or more BBUs includes a plurality of sector connections operable to output the one or more digital outputs.

3. The system of claim 2, wherein each of the plurality of sector connections comprises an optical output.

4. The system of claim 1, wherein each of the plurality of DMUs are operable to receive digital signals from each of the one or more BBUs.

5. The system of claim 1, wherein the plurality of DMUs are coupled to each other and coupled to the plurality of DRUs via at least one of Ethernet cable, Optical Fiber, Microwave Line of Sight Link, Wireless Link, or Satellite Link.

6. The system of claim 1, wherein the plurality of DRUs are connected in a daisy chain configuration.

7. The system of claim 1, wherein the plurality of DRUs are connected to the plurality of DMUs in a star configuration.

8. The system of claim 1, wherein the plurality of DMUs are connected to the BBUs via at least one of Ethernet cable, Optical Fiber, Microwave Line of Sight Link, Wireless Link, or Satellite Link.

9. The system of claim 1, wherein the plurality of DRUs are connected in a loop to one of the plurality of DMUs.

10. The system of claim 1, wherein a DRU of the plurality of DRUs is operable to receive first digital signals from a first BBU of the one or more BBUs and second digital signals from a second BBU of the one or more BBUs.

11. The system of claim 1, wherein one of the DRU of the plurality of DRU is operable to receive a first digital signal from a first output of a BBU of the one or more BBUs and a second digital signal from a second output of the BBU.

12. The system of claim 11, wherein the first output is associated with a first sector of the BBU and the second output is associated with a second sector of the BBU.

13. A method for routing signals in a Distributed Antenna System including a plurality of Digital Multiplexer Units (DMUs), a plurality of Digital Access Units (DAUs), and a plurality of Digital Remote Units (DRUs), the method comprising:

receiving, at one or more digital input ports of the plurality of DMUs, digital signals from one or more digital outputs of one or more Base Band Units (BBUs);

routing the digital signals between the pluralities of DMUs through one or more peer ports;

receiving, at one or more analog RF ports of the plurality of DAUs, analog RF signals from one or more of Base Transceiver Stations (BTSs);

converting by one or more of the plurality of DAUs, the received analog RF signals from the one or more BTSs into digital BTS signals;

collating by one or more of the plurality of DAUs the digital BTS signals with one or more of the digital signals from the plurality of DMUs; and transporting the collated digital BTS signals and the one or more of the digital signals to one of the plurality of DRUs;

routing the digital signals from one of the plurality of DMUs to one of the plurality of DAUs; and transporting the digital signals from one or more of the DAUs to one or more of the plurality of DRUs.

14. The method of claim 13, wherein routing the digital signals between the plurality of DMUs and the one or more DAUs comprises using routing tables.

15. The method of claim 14, wherein the routing tables are provided at a server coupled to the plurality of DMUs.

16. The method of claim 14, wherein the routing tables are provided at one or more of the plurality of DRUs.

17. The method of claim 16, wherein the routing tables comprise Merge Blocks.

18. The method of claim 13, wherein a power level of each carrier in each of the plurality of DRUs is independently controlled.

19. The method of claim 13 further comprising routing the digital signals between the plurality of DMUs by:

collating a first digital signal received from a first BBU and a second digital signal received from a second BBU; and directing the collated digital signal to one of the plurality of DRUs.

20. The method of claim 13, wherein a DRU of the plurality of DRUs is operable to receive a first digital signal received from a first BBU of the one or more BBUs and a second digital signal received from a second BBU of the one or more BBUs.

21. The method of claim 13, wherein a DRU of the plurality of DRUs is operable to receive a first digital signal received from a first output of a BBU of the one or more BBUs and a second digital signal received from a second output of the BBU.

22. The method of claim 21, wherein the first output is associated with a first sector of the BBU and the second output is associated with a second sector of the BBU.

23. A Distributed Antenna System (DAS) comprising:

a plurality of Digital Multiplexer Units (DMUs), each of the plurality of DMUs including a peer port and being coupled to at least one of the plurality of DMUs and operable to route signals through the peer port, wherein each of the plurality of DMUs includes one or more digital input ports operable to receive one or more digital inputs from one of more of a plurality of Base Band Units (BBUs), each of the plurality of BBUs including one or more digital output ports;

a plurality of Digital Access Units (DAUs), each of the plurality of DAUs being coupled to at least one of the plurality of DAUs and operable to route signals between the plurality of DAUs and at least one DAU of the plurality of DAUs being coupled to at least one DMU of the plurality of DMUs and operable to route signals from the plurality of DMUs to the plurality of DAUs, wherein each of the plurality of DAUs includes one or more analog RF input ports operable to receive analog RF inputs from one of more of a plurality of Base Transceiver Stations (BTSs), each of the plurality of BTSs including one or more analog RF output ports; and a plurality of Digital Remote Units (DRUs), each of the plurality of DRUs being coupled to at least one of the plurality of DAUs to receive signals from one or more of the plurality of BTSs and from one or more of the plurality of BBUs, wherein the plurality of DRUs are operable to transport signals between the plurality of DRUs and the plurality of DAUs, each of the plurality of DRUs including a remote antenna.

24. The DAS of claim 23, wherein each of the one or more digital input ports of each of the plurality of DMUs is associated with a sector of a corresponding BBU of the plurality of BBUs.

25. The DAS of claim 23, wherein each of the one or more analog RF output ports of each of the plurality of BTSs is associated with a sector of a corresponding BTS of the plurality of BTSs.

26. The DAS of claim 23 wherein:
one of the one or more digital output ports of one of the BBUs is connected to one of the one or more digital inputs ports of the DMU using an optical fiber; and
one or more of the DAUs of the plurality of DAUs is coupled to one or more DRUs of the plurality of DRUs via an optical cable.

27. The DAS of claim 23, wherein a DRU of the plurality of DRUS is operable to receive first digital inputs from a first sector of a BBU of the plurality of BBUs and second downlink inputs from a second sector of the BBU.

* * * * *